United States Patent [19]
Brown

[11] Patent Number: 5,112,375
[45] Date of Patent: May 12, 1992

[54] RADIAL VANE DEMISTING SYSTEM IN A SEPARATOR FOR REMOVING ENTRAINED DROPLETS FROM A GAS STREAM

[75] Inventor: Michael R. Brown, Tulsa, Okla.

[73] Assignee: Natco, Tulsa, Okla.

[21] Appl. No.: 687,299

[22] Filed: Apr. 18, 1991

[51] Int. Cl.⁵ ............................................. B01D 45/00
[52] U.S. Cl. ............................................. 55/440
[58] Field of Search ..................... 55/440, 434, 498

[56] References Cited

U.S. PATENT DOCUMENTS

| | | | |
|---|---|---|---|
| 2,746,562 | 5/1956 | Ryall | 183/67 |
| 3,010,537 | 11/1961 | Baker et al. | 183/34 |
| 3,352,778 | 11/1967 | Brink, Jr. et al. | 210/23 |
| 3,813,855 | 6/1974 | Hill et al. | 55/440 |
| 4,017,275 | 4/1977 | Hodgson et al. | 55/1 |
| 4,264,411 | 4/1981 | Almond | 55/440 |
| 4,516,994 | 5/1985 | Kocher | 55/337 |

FOREIGN PATENT DOCUMENTS

| | | | |
|---|---|---|---|
| 497034 | 3/1976 | U.S.S.R. | 55/440 |
| 578985 | 11/1977 | U.S.S.R. | 55/440 |
| 322967 | 12/1929 | United Kingdom | 55/440 |
| 2119674 | 11/1983 | United Kingdom | 55/498 |

*Primary Examiner*—Bernard Nozick
*Attorney, Agent, or Firm*—Head and Johnson

[57] ABSTRACT

A demisting system used to remove entrained liquid droplets from a gas stream employing radially arranged serpentine vanes. The radial arrangement of the vanes provides flow paths in which the leading edges of the serpentine vanes are closer together than the trailing edges so that a gas stream must undergo a series of direction and velocity changes. Centrifugal forces act to cause liquid droplets to impinge on the surface of the vanes. Surface tension holds the liquid on the vanes as it collects and gravity causes the collected liquid to drain downward and out of the demisting system.

2 Claims, 3 Drawing Sheets

RADIAL VANE DEMISTING SYSTEM IN A SEPARATOR FOR REMOVING ENTRAINED DROPLETS FROM A GAS STREAM

DISCLOSURE STATEMENT

Copies are enclosed of the U.S. patents listed on PTO Form 1449, which were found in a patentability search of the field.

The Ryall patent discloses a device in which compressed air containing droplets is directed onto a suitable surface to cause separation of the liquid phase from the gas phase by condensation of the vapors.

The Baker et al patent discloses a device wherein large liquid droplets are removed by centrifugal separation; smaller droplets are removed by a first filter means; and a baffle containing agglomerating tube assembles which separates the device into two chambers and functions to coalesce small liquid droplets into larger liquid droplets.

The Brink et al patent is directed to novel shaped fibers used in a filtering apparatus and does not disclose a radial placement of serpentine vanes as disclosed in the present application.

The Hill et al patent discloses serpentine vanes mounted in parallel. However, this device does not disclose radial placement and thus does not have a pressure drop due to the expanding distance between the vanes which causes a decease in gas velocity as disclosed in the present application.

The Hodgson et al patent discloses a device containing a vortex tube which uses centrifugal action to throw liquid droplets outwardly to drain into a central chamber via a gap between two sections of the vortex tube. The gas passes upwardly through a first mist extractor and then through elongated vertical obstacles where the liquid droplets are scrubbed out against these surfaces.

The Kochner patent discloses a vertical vessel incorporating a method of mist extraction in which a flat piece of metal twisted into a spiral shape is positioned inside an inlet tube. This structure causes an incoming mixture to impinge forcefully against the tube wall. The smaller liquid droplets coalesce into larger droplets and drop through a filter element.

BACKGROUND OF THE DISCLOSURE

1. Field of the Invention

This invention relates to an improved arrangement of demisting vanes for liquid/gas separators in which the entrained liquid droplets in a gas stream are removed. More specifically, the liquid droplets impact the demisting vanes and are drained from the demisting element.

2. Description of the Related Art

In the oil and gas and chemical process industries, free liquid is separated from pressurized gas in "separators" and "scrubbers." These devices are pressure containing vessels with internal structure designed to promote phase separation. The heart of a separator is the "mist extractor" which can be one of many different kinds.

Some demisting elements of the prior art utilizes serpentine vanes arranged in parallel to remove entrained liquid droplets from a flowing gas stream. This is referred to as a conventional cross flow separator.

Other similar "chevron" type demisters are common within the industry. The demisting elements are arranged so that the gas stream must undergo a series of directional and velocity changes. Centrifugal forces exerted on the heavier liquid cause the entrained liquid droplets to impinge on the vane surface. Surface tension holds the liquid onto the vane surface as it collects and drains downward.

SUMMARY OF THE INVENTION

A series of radially aligned, spaced apart serpentine demisting vanes are positioned between inner and outer perforated cylinders to form a demisting element. This demisting element is contained within a vertical separator such as a cylindrical upright vessel. The gas stream enters the demisting element through an interior perforated cylinder and is directed radially outward through the demisting vanes. The gas enters the serpentine arrangement of vanes where centrifugal force causes the entrained liquid droplets to impact on the vane surfaces. The liquid droplets coalesce and drain into a liquid reservoir. The dry gas then exits the demisting element through the outer perforated cylinder and exits the separator.

DESCRIPTION OF THE PREFERRED EMBODIMENT

Figure 1:
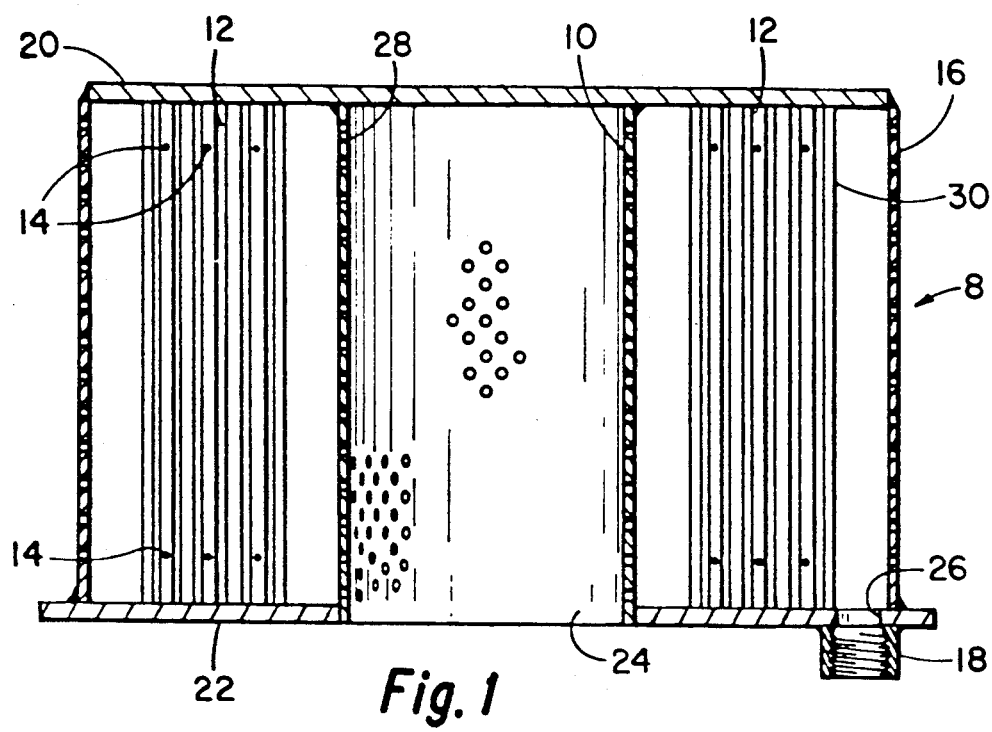
FIG. 1 is an enlarged cross-sectional side view of the demisting element.
Figure 4:
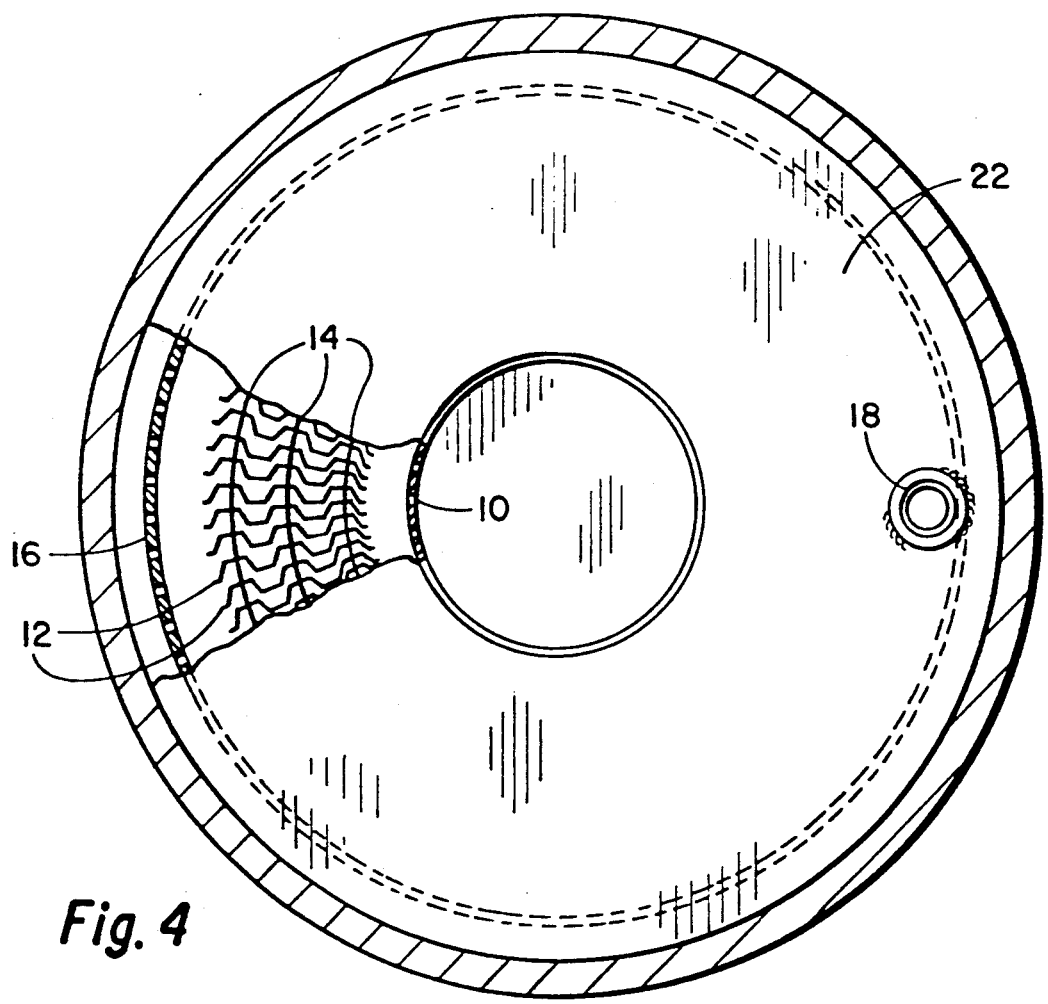
FIG. 4 is a bottom view with a partial cut-away section of the demisting element taking alone the line 4—4 of FIG. 3.

FIG. 1 illustrates a preferred embodiment of the demisting system of this disclosure, generally indicated by the numeral 8. The demisting system includes an arrangement of radial, spaced apart serpentine vanes. The principle object of this invention is to provide an improved demisting system for removing entrained liquid droplets from a gas stream. This novel gas demisting system is well suited for use in vertical separators which are often preferred in high gas/oil ratio applications or where space limitation might exist. However, this gas demisting system could be used in other environments where entrained liquid droplets are desired to be removed from a gas stream.

The demisting system 8 includes an inner and an outer perforated cylinder 10 and 16. Between these cylinders radially arranged, spaced apart serpentine vanes 12 are positioned. Spacing rods 14 hold serpentine vanes 12 in a spaced relationship. A top plate 20 closes the top of the demisting system, and a vane support ring 22 supports the vanes in their spaced apart relationship. Vane support ring 22 has a central opening 24 and at least one smaller diameter opening 26 spaced from central opening 24.

The inner perforated cylinder 10 is spaced from and encircles the leading edges 28 of serpentine vanes 12. The outer perforated cylinder 16 is spaced from and encircles the trailing edges 30 of serpentine vanes 12. Top plate 20 encloses the top of the demisting system and extends outward and attaches, such as by welding, to the outer perforated cylinder 16. Vane support ring 22 is located on the bottom of the demisting element and extends outward for attachment, such as by welding, to a vertical tubular wall 32 of separator vessel, generally indicated by the numeral 34 as shown in FIG. 3.

Figure 3:
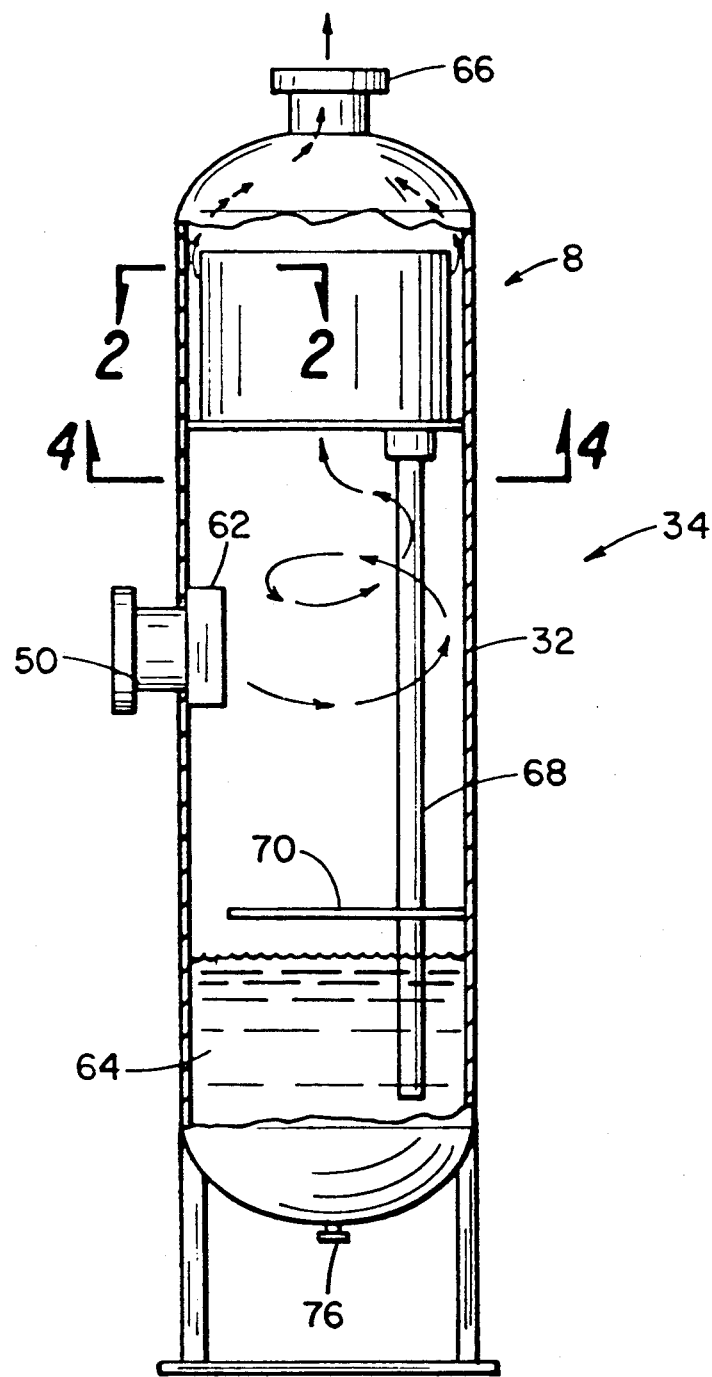
FIG. 3 is partially cut away side elevational view of the separator vessel of this disclosure.

Attention is now directed to FIG. 3 which illustrates a side, elevational view of a separator vessel 34 with the demisting system 8 installed therein. Vessel 34 has a gas inlet 50 located on the side thereof. Gas containing entrained liquid droplets enters vessel 34 and is directed in a circular manner by a gas divert 62. As gas flows in a circular manner in the interior of the vessel some of the entrained liquid droplets impact with and collect on the interior of the vessel wall. Gravity forces act on the liquid and it drains into a liquid reservoir 64. The gas flows upwards into the demisting system 8 through opening 24 in plate 22. The gas flows radially outwardly between vanes 12 and out through perforated cylinder 16. The gas, having a substantial portion of entrained liquid extracted therefrom, exits demisting system 8 as it passes through the outer perforated cylinder 16 and passes out of vessel 34 via gas outlet 66 located in the vessel top.

Figure 2:
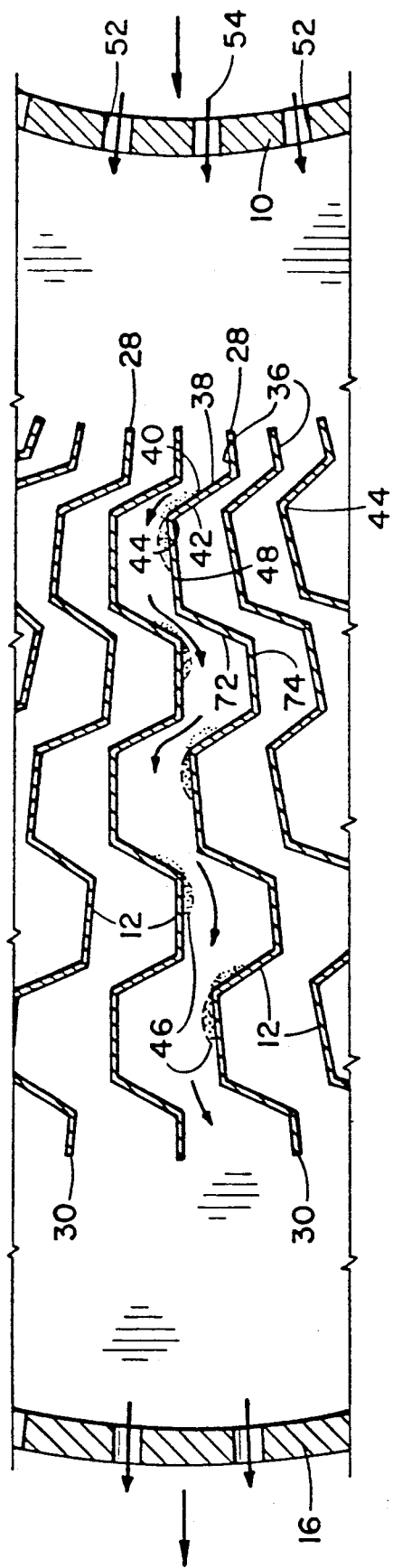
FIG. 2 is a top sectional view of some of the serpentine vanes taken along the line 2—2 of FIG. 3 without the spacing rods being shown.

Attention is now directed to FIG. 2 for more detailed description of the serpentine vane arrangement. FIG. 2 is a top view of the serpentine vanes 12. The vane inner and outer ends 28, 30 are spaced from both the inner perforated cylinder 10 and the outer perforated cylinder 16. Each serpentine vane 12 is a flat plate bent to form integral rib structures. A space between the vanes form serpentine pathways arranged in a radial pattern. The resulting pathways have a narrower width near the leading edges 28 of the vanes than near the vanes trailing edges 30.

Closer examination of the gas flow entails a description of one of the pathways. A pathway is the passage outlined by two adjacent demisting vanes as illustrated in FIG. 2. Each vane has rib structures formed by a first flat surface 36, a first angled surface 38 connected to the first flat surface 36 having a first side 40 and a second side 42, a second flat surface 48 connected to the first angled surface 38, a second angled surface 72 connected to the second flat surface 48, and a third flat surface 74 connected to the second angled surface 72, and so forth, forming a series of vertical integral rib structures. Each vane thus has a plurality of rib structures.

In operation of the demisting system gas enters through central opening 24 in the vane support ring 22. The gas then passes through openings 52 in the inner perforated cylinder 10 which are of sufficient size and located on the inner perforated cylinder 10 in such a manner as to create a sufficient pressure drop to evenly distribute the gas stream containing entrained liquid droplets across serpentine vanes 12.

The gas stream enters the serpentine pathway as illustrated by arrows 54. The gas is evenly distributed across all the pathways. For illustration purposes the gas flow through one of the pathways will be examined. First, the gas containing entrained liquid droplets enters the pathway located between two leading edges 28 of the first flat surfaces 36 of two adjacent serpentine vanes 12. The first angled surface 38 causes the gas stream to suddenly change direction. At each change in direction in the pathway, centrifugal forces act on the liquid droplets entrained in the gas stream causing the liquid droplets to impact against first side 40 of first angled surface 38.

The gas flows around corner 44 forming a low pressure zone 46 near second flat surface 48. The liquid droplets coalesce, and gravity causes the liquid to drain downwardly on second flat surface 48. Liquid droplets coalescing on first angled surface 38 either flow downwardly on the surface by the force of gravity or are blown to another surface on the serpentine vanes by the gas stream. Once the liquid drains down the vane surfaces, it collects on top of the vane support ring 22 and flows to the drain means 18.

As the gas stream flows outward, its average velocity is slowed due to the increasing width of the pathways. The demisting element's design provides for the gas stream velocity at trailing edge 30 of serpentine vane 12 to be slow enough to prevent re-entrainment. Re-entrainment occurs when the gas velocity is sufficiently high enough to cause some of the liquid droplets draining down the serpentine vanes to be blown off the trailing edge of the serpentine vanes and re-enter the exiting gas stream.

The liquid removed from the gas stream by the demisting system exits via opening 26. A drain pipe 68 is connected to second opening 26 in vane support ring 22. The drain pipe 68 extends from the bottom of vane support ring 22 into a liquid reservoir 64. The lower end of drain pipe 68 is submerged in liquid reservoir 64 so that gas does not by-pass serpentine vanes 12 within vessel 34. The liquid drains from the vessel via second outlet 76. Liquid level is controlled to prevent cycling and is maintained above the bottom of drain pipe 68 but below horizontal shelf 70. The method of controlling the liquid level is not illustrated since such is well known to practitioners in the gas demising art.

A horizontal shelf 70 is located immediately above liquid reservoir 64. The horizontal shelf has a passage so that liquid draining from the interior of the vessel walls can drain into liquid reservoir 64. The purpose of shelf 70 is to shield a large part of the surface area of liquid reservoir 64 to prevent gas entering vessel 34 from blowing against liquid in the liquid reservoir 64 and to thereby reduce re-entrained liquid into the gas.

The effectiveness of the demisting system is reduced when gas velocity passing through serpentine vanes 12 is so high as to tear the fluid film off trailing edge 30 of the vanes, causing re-entrainment. Effectiveness is also reduced at low flow rates when very low gas velocity through the vane pathways produce insufficient centrifugal forces to cause impingement of the liquid onto serpentine vanes 12. This allows droplets to channel through serpentine vanes 12. Thus, the demisting system functions best within upper and lower gas flow rate limits. The size of a mist extractor is determined as that which will keep the velocity below the magnitude which produces re-entrainment, but at least that which produces sufficient centrifugal force needed for separation. If applicable, a "turndown" limit may be placed on the flow capacity to prevent failure due to low gas velocity.

This disclosure provides a demisting system for use in relatively large vertical separators offering these three benefits over conventional cross flow separators:
1. Physical Size Reduction: This system is able to reduce vessel length from that required for a conventional cross flow separator.
2. Improved Separation Efficiency: This disclosure provides a system that enhances removal of the smaller liquid droplets. This advantage is due to the high initial velocity occurring at the leading edges of the serpentine vanes which decrease as the gas stream approaches the trailing edges of the vanes.

The reduced flow velocity helps prevent re-entrainment at the vanes trailing edges.

3. Wider Turndown Ratio: The gas flow rate can be reduced to lower values than in conventional cross flow designs without causing re-entrainment.

The gas flow area upon which a vane section size is determined is the area perpendicular to the flow at trailing edge 30 of the vanes. In a conventional cross flow or transverse flow pattern, the area of the demisting element is obtained by calculating the minimum allowable inside diameter and then making the vane's vertical height sufficient to obtain the desired flow area. In the presented disclosure, the flow area is the cylindrical imaginary surface circumscribing vane trailing edges 30. Therefore the circumferential dimension is much greater than the vane width in a conventional cross-flow design. Therefore, vane height in the radial placement of this disclosure is much less than the vane height in a conventional cross flow or transverse design. This advantage allows the design of a shorter vessel at reduced cost compared with systems requiring taller vessels.

The claims and the specification described the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A gas demister for separating entrained droplets from a gas stream, comprising:
    an inner and a concentric outer perforated cylinder, the cylinders being upright and of substantially identical length, each cylinder having a top and a bottom end, the cylinders providing an annular area therebetween and having a common cylindrical axis;
    a top plate closing said top ends of both said cylinders;
    a bottom plate having a central opening therein of diameter substantially that of said inner cylinder, the bottom plate being secured to said bottom ends of said cylinders, the opening therein providing a gas inlet passageway into said inner perforated cylinder;
    a plurality of vertically and radially arranged vanes positioned in said annular area between said inner and outer perforated cylinders and between said top and bottom plates wherein each vane has a plurality of spaced apart flat inline portions past which a gas flow stream flows, the flat inline portions being in a radial plane of said common cylindrical axis, and a plurality of angled flat portions each extending at an angle to and integrally formed with said inline portions such that entrained droplets impact against such angled portions;
    the inline and angled portions being repeated between each vane inner end and outer end, the inner end of each vane being adjacent and spaced from said inner perforated cylinder providing an open annular area between said inner perforated cylinder and said vanes and the outer end of each vane being adjacent and spaced from said outer perforated cylinder providing an open annular area between said outer perforated cylinder and said vanes, the vanes providing a plurality of generally radially extending contoured flow paths for gas passing through said inner perforated cylinder and outwardly through said outer perforated cylinder, the vanes forming surfaces for the collection of droplets therein which drain downwardly onto said bottom plate, the bottom plate having a drainage opening therein through which liquid collected from entrained droplets passes out of the demisting system.

2. A gas demister according to claim 1 wherein said drainage opening in said bottom plate communicates with said open annular area between said outer perforated cylinder and said vanes.

* * * * *